United States Patent Office 3,525,933
Patented Aug. 25, 1970

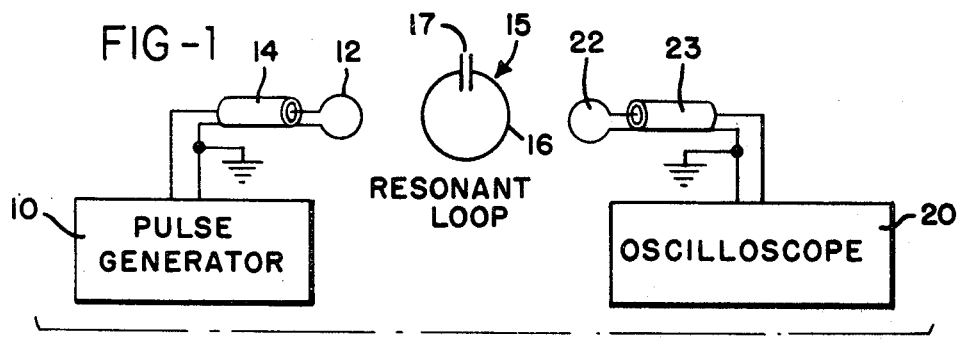
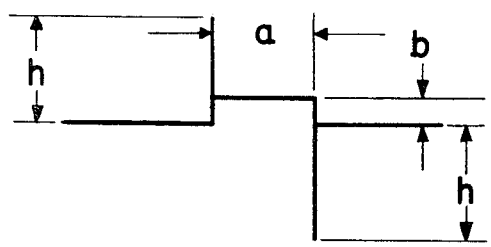
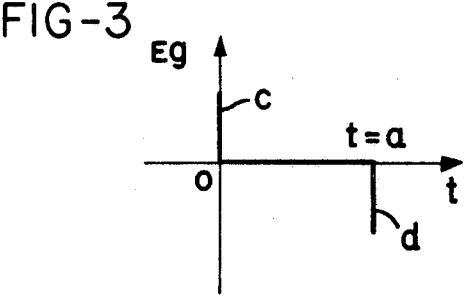
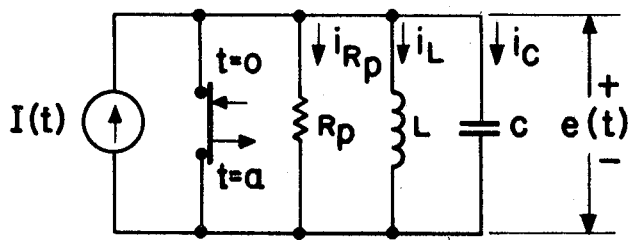
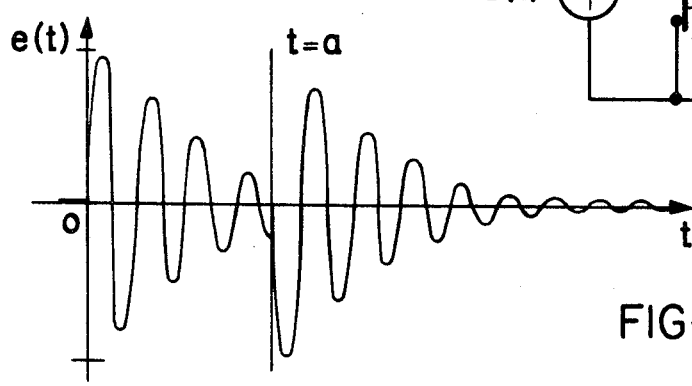
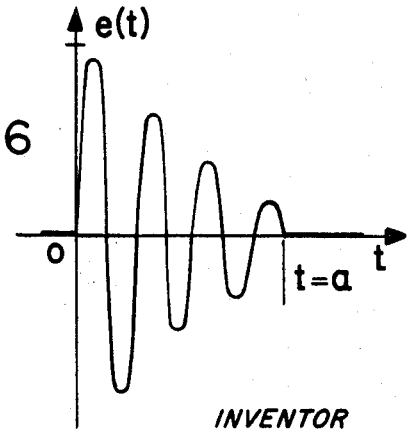
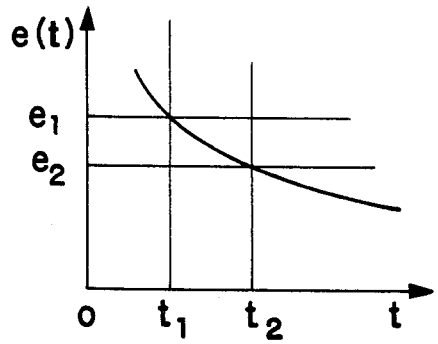
INVENTOR
GEORGE H. KRAMER
BY
Marechal, Biebel, French & Bugg
ATTORNEYS

3,525,933
METHOD FOR DETERMINING THE RESONANT FREQUENCY OF TUNED CIRCUITS BY USING A VARIABLE PULSE WIDTH GENERATOR
George H. Kramer, Dayton, Ohio, assignor to Dayton Electronic Products Company, Dayton, Ohio, a corporation of Ohio
Filed May 2, 1968, Ser. No. 726,030
Int. Cl. G01r 27/00; H03b 1/00
U.S. Cl. 324—57     4 Claims

ABSTRACT OF THE DISCLOSURE

The resonant frequency of a tuned circuit is determined by measuring the time between two pulses of energy, the first pulse causing the circuit to begin oscillating and the second pulse causing the oscillations to cease. A pulse generator having a variable width square wave output supplies energy to a coil loosely coupled to the circuit undergoing test with the oscillations within the tuned circuit being observed on an oscilloscope having its vertical input connected to another coil, also loosely coupled to the tuned circuit.

BACKGROUND OF THE INVENTION

Oscillations or ringing can be induced into a tuned or resonant circuit upon the applicatiton of a pulse, with the rate of decay of the oscillations being dependent upon the Q of the circuit. An infinite Q circuit, corresponding to a circuit having zero loss, will allow the oscillations to continue for an infinite period of time, while a low Q circuit, indicating a circuit having high losses, will oscillate for only a short period of time. The loaded Q of the resonant circuit can be expressed in terms of its resonant frequency and oscillation decay rate as $$Q_L = \frac{\omega_o \Delta t}{2 \ln(e_1/e_2)} = \frac{\pi f_o \Delta t}{\ln(e_1/e_2)} \quad (1)$$

where $e_1$ is the voltage at $t_1$ and where $e_2$ is the voltage at $t_2$ and where $\Delta t = t_2 - t_1$.

If, for convenience, we let $$e_2 = \frac{1}{\epsilon} e_1$$

then $$Q_L = \frac{\pi f_o \Delta t}{\ln\left(\frac{e_1}{e_1/\epsilon}\right)} = \frac{\pi f_o \Delta t}{\ln(\epsilon)}$$

$$= \pi f_o \Delta t \quad (2)$$

Thus, when the time elapsed between $e(t) = e_1$ and $e(t) = e_1/\epsilon$ is known, the loaded Q of the resonant frequency can be determined directly. Of course, the loaded Q is essentially equal to the unloaded Q where the loading effects of the instrumentation on the resonant circuit undergoing investigation are negligible.

For measurement purposes, it has been found more convenient to use the expression $e_2 = e_1/2$, rather than $e_2 = e_1/\epsilon$. For this special case, therefore, $$Q_L = \frac{\pi f_o \Delta t}{\ln\left(\frac{e_1}{e_1/2}\right)} = \frac{\pi f_o \Delta t}{0.6931}$$

$$= 4.53266 f_o \Delta t \quad (3)$$

In each of these expressions, the resonant frequencies ($f_o$) must be determined in order to provide information for the Q of the circuit. In some cases, the resonant frequencies can be determined by counting the number of cycles within a predetermined distance on the face of the oscilloscope, provided a known, calibrated time base is used.

BRIEF SUMMARY OF THE INVENTION

This invention relates to a method for determining the resonant frequency of a tuned circuit. More particularly, this invention utilizes a pulse generator having a variable width square wave output wherein the leading edge of the square wave is used to cause the tuned circuit to begin oscillating and wherein, when properly adjusted, the trailing edge of the square wave will cause the circuit to cease oscillating. The oscillations within the tuned circuit may be monitored by an oscilloscope having its vertical input attached to a coil located in proximity to the tuned circuit but which draws negligible energy from that circuit.

The output of the pulse generator is shaped (differentiated) such that pulses of energy are produced at the beginning and end of the square wave, each pulse being of very short duration and having an amplitude much greater than the rectangular portion of the square wave, and therefore the pulse generator may be considered as a means to provide two spaced apart pulses of energy of opposite polarity, the first or leading edge pulse being used to initiate oscillations within the tuned circuit, and the second or tailing pulse causing the resonant circuit to cease oscillating.

The width of the properly adjusted square wave from the pulse generator, and therefore the time or spacing between the resultant two pulses of energy, is a measure of the resonant frequency of the circuit. Also, by producing a second square wave having a width greater than the first square wave, which also produces two pulses of energy of short duration causing the tuned circuit to begin and then cease oscillating, an unambiguous determination of the resonant frequency may be made.

It is therefore an object of this invention to provide an improved and accurate method for determining the resonant frequency of a circuit by causing the circuit to begin oscillating upon the application of a pulse of energy of short duration, by causing the oscillations to cease upon the application of another pulse of energy of short duration, and by measuring the time interval between these two pulses as an indicatiton of the resonant frequency of the circuit; and to provide a method for determining the resonant frequency of a circuit which method comprises the steps of impressing a first pulse of energy upon the circuit while observing the oscillations with an oscilloscope, impressing a second pulse of energy upon the circuit which, while observing the oscilloscope, is noted as damping-out the oscillations immediately, and noting the time difference between these two pulses, varying the time between the pulses until a second such damping-out occurrence is noted, and measuring the time difference between the second pair of pulses, with the difference between the two time measurements being an indication of the resonant frequency of the circuit undergoing test.

BRIEF DESCRIPTION OF THE INVENTION

FIG. 1 is a schematic view showing the apparatus required to perform the method of this invention;

FIG. 2 is a curve showing the output square wave from the pulse generator, differentiated by a short transmission line terminated by a small coupling loop or coil;

FIG. 3 is a curve showing the equivalent output from the coil connected to the pulse generator;

FIG. 4 is an electrical equivalent to the circuit shown in FIG. 1;

FIG. 5 is a graph showing the oscillations within a tuned circuit when the width of the square wave is not adjusted to a multiple of the resonant frequency;

FIG. 6 is a curve showing the oscillations within the resonant frequency when the width of the square wave is adjusted to a multiple of the resonant frequency; and FIG. 7 is a curve showing the average decay of the oscillations within the tuned circuit.

DETAILED DESCRIPTION OF THE DRAWINGS

Reference is now made to the drawings, and particularly to FIG. 1, where a pulse generator 10 is shown connected to a small coil 12, approximately three inches in diameter, by means of a coaxial cable 14. The coil 12 is located in close proximity to the tuned circuit 15 undergoing investigation. The pulse generator may be of practically any type, and a Dumont Model 404B pulse generator has been found to be satisfactory.

The tuned circuit 15 undergoing test includes a coil 16 and a capacitance 17. In one experiment, the coil 16 was formed from a single loop of wire, approximately ten inches in diameter, and the capacitance 17 formed from a pair of copper plates, each approximately four inches square and spaced approximately 0.136 inch apart. The resonant frequency of this circuit was determined by the method of this invention as 29.3 mHz.

An oscilloscope 20 was used to monitor the oscillations within the tuned circuit 15, with the vertical input to this scope being connected to a sensing coil 22 by means of a coaxial cable 23. The sensing coil 22, also approximately three inches in diameter, is positioned in close proximity to the tuned circuit, but draws negligible energy from the circuit. A Tektronix type 547 oscilloscope was used during these experiments.

When the pulse generator is triggered, it produces an output square wave having an adjustable width as shown in FIG. 2. Typically, the differentiated output also contains pulses $c$ and $d$, the amplitude $h$ of which is significantly greater than the amplitude $b$ of the rectangular portion of the square wave. Therefore, the effective generator output may be represented by the two pulses shown in FIG. 3, pulse $c$ representing the leading edge of the square wave and pulse $d$ representing the trailing edge of the square wave, with the spacing between pulses $c$ and $d$ equal to the pulse width $a$ of the square wave. This output is a result of the coil 12 being connected across the fifty ohm output of the pulse generator 10, therefore the pulse source output appeared as an inductor in parallel with a very small resistor.

The equivalent circuit is shown in FIG. 4 where $R_p$ is the equivalent parallel resistance of the antiresonant circuit. The current $I(t)$ in the resonant loop can be expressed by the following equation $$I(t) = i_{R_p} + i_L + i_C \quad (4)$$

where L is the inductance of the circuit, and C is the capacitance of the circuit.

Introducing the current impulse functions, $$I[\delta(t) - \delta(t-a)] = \frac{e(t)}{R_p} + \frac{1}{L}\int e(t)\,dt + C\frac{de(t)}{dt} \quad (5)$$

where $I$ is the maximum current amplitude and $a$ is the pulse width.

Using the Laplace Transformation, Equation 5 becomes $$I - I\epsilon^{-as} = \frac{e(s)}{R_p} + \frac{e(s)}{sL} + sCe(s) \quad (6)$$

Through manipulation, Equation 6 becomes $$e(s) = \frac{I}{C} \cdot \frac{s(1-\epsilon^{-as})}{\left(s+\frac{1}{2R_pC}\right)^2 + \left(\frac{1}{LC} - \frac{1}{4R_p^2C^2}\right)}$$

Assuming $I$ to be constant, then $$e(s) = k\frac{s(1-\epsilon^{-as})}{(s+\alpha)^2+\beta^2}$$

$$= \frac{ks}{(s+\alpha)^2+\beta^2} - \frac{ks\epsilon^{-as}}{(s+\alpha)^2+\beta^2} \quad (7)$$

where $$k = \frac{I}{C}$$

$$\alpha = \frac{1}{2R_pC}$$

$$\beta = \sqrt{\frac{1}{LC} - \frac{1}{4R_p^2C^2}}$$

The inverse transform of Equation 7 is $$e(t) = \frac{k}{\beta}(\alpha^2+\beta^2)^{1/2} \cdot \epsilon^{-\alpha t}\cdot\sin(\beta t + \Psi)$$
$$-\delta(t-a)\frac{k}{\beta}(\alpha^2+\beta^2)^{1/2}\epsilon^{-\alpha t}\epsilon^{\alpha a}\sin[\beta(t-a)-\Psi] \quad (8)$$

where $$\Psi = \tan^{-1}\left(\frac{\beta}{-\alpha}\right)$$

This is the expression for the transitory oscillations in the resonant loop when a pair of current impulses such as pulses $c$ and $d$ shown in FIG. 3 are coupled in.

The relationship between the pulse width $a$ required to produce $e(t)=0$ at $t=a$ and the resonant frequency of the tuned circuit 15 can be found by writing (8) as follows:

$$\frac{k}{\beta}(\alpha^2+\beta^2)^{1/2}\cdot\epsilon^{-\alpha t}\cdot\sin(\beta t+\Psi)$$
$$= \frac{k}{\beta}(\alpha^2+\beta^2)^{1/2}\cdot\epsilon^{-\alpha t}\cdot\epsilon^{\alpha a}\cdot\sin[\beta(t-a)+\Psi] \quad (9)$$

Since $t=a$ is an assumption for this consideration, it may be stated for $e(t)=0$ at $t=a$, $$\sin(\beta a+\Psi) = \epsilon^{\alpha a}\sin\Psi. \quad (10)$$

For large $R_p$ (small loss resistance $\beta \gg \alpha$ so that $$\Psi = \tan^{-1}\left(\frac{\beta}{-\alpha}\right) \approx \frac{\pi}{2}$$

Expression (10) then becomes $$\sin\left(\beta a + \frac{\pi}{2}\right) \approx \epsilon^{\alpha a}$$

which can be written as $$\sin\beta a\cos\frac{\pi}{2} + \cos\beta a\sin\frac{\pi}{2} \approx \epsilon^{\alpha a}\cos\beta a \approx \epsilon^{\alpha a}$$

Then $$a = \frac{1}{\alpha}\ln(\cos\beta a) \quad (11)$$

This expression represents the conditions which exist for $e(t)=0$ at $t=a$.

At this point it is convenient to note that the pulse width $a$ is at all times positive. Therefore, in Equation 11 $1/\alpha \ln(\cos\beta a)$ must be positive to be a solution. The term $1/\alpha \ln(\cos\beta a)$ can be positive only when $\cos\beta a$ is not $<1$, i.e., when $\cos\beta a=1$.

This occurs when $\beta a = 0, 2\pi, 4\pi \ldots 2n\pi$. Therefore, for $e(t)=0$ at $t=a$, the pulse width $a$ is given by $$a = n\frac{2\pi}{\beta}$$

$$= n\frac{2\pi}{\sqrt{\frac{1}{LC}-\frac{1}{4R_p^2C^2}}} \quad (12)$$

For a high-Q circuit, as for example circuits having a Q of greater than 10, Equation 12, becomes $$a \approx n2\pi\sqrt{LC} \quad (13)$$

For high-Q circuits the pulse width $a$ required to make $e(t)=0$ at $t=a$ is equal to the period of free oscillation (or multiples thereof) of the resonant circuit; i.e., $$\frac{1}{a} \approx \frac{1}{nT} = \frac{1}{n2\pi\sqrt{LC}} = \frac{f_o}{n} \quad (14)$$

For low Q circuits the pulse width $a$ required to make $e(t)=0$ at $t=a$ can be calculated using Equation 12.

FIG. 5 is a curve representing the oscillations within the tuned circuit 15 when the pulse width $a$ of the square wave from the pulse generator 10 is not adjusted to a time which is some multiple of the resonant frequency. Upon the occurrence of pulse $c$ at $t=0$, the circuit begins to oscillate and decays at a rate determined by the Q of the circuit. This decay rate may be seen more clearly in FIG. 7 which is a curve representing the maximum amplitude of the oscillations within the circuit 15. Upon the occurrence of the pulse $d$ at $t=a$, the tuned circuit 15 is again excited and a new set of oscillations begins. Since only two pulses of short duration are applied to the circuit as a result of the output from the pulse generator 10, the oscillations within the circuit 15 eventually decay to a zero value.

On the other hand, if the width $a$ of the square wave is carefully adjusted so that the pulse $d$ occurs at a time which is some multiple of the resonant frequency of the tuned circuit 15, then the oscillations which occur within that circuit will be similar to that shown in FIG. 6. The pulse $c$ at $t=0$ causes the tuned circuit to begin oscillating, and its energy will decay again at a rate determined by its Q, while the pulse $d$ at $t=a$, will cause the oscillations within the circuit 15 to cease completely and immediately. When this phenomenon is observed on an oscilloscope, the width $a$ of the square wave, or the time between the two pulses, is measured either by a direct dial calibration on the pulse generator 10 or by utilizing a calibrated time base on the oscilloscope, and the resonant frequency of the circuit 15 determined from the equations above.

As shown in these equations, the pulse $d$ may occur at several different times and still be able to cause the oscillations in the tuned circuit 15 to cease. By measuring the difference in width between two square waves, both of which cause the circuit to cease oscillating as shown in FIG. 6, an unambiguous determination of the resonant frequency may be made.

Therefore, a method for determining the resonant frequency of the tuned circuit has been described utilizing commonly available equipment, such as a pulse generator and oscilloscope, and once the resonant frequency is known, the Q of the circuit may also be determined quickly.

While the method herein described constitutes a preferred embodiment of the invention, it is to be understood that the invention is not limited to this precise method, and that changes may be made therein without departing from the scope of the invention.

What is claimed is:
1. A method for determining the resonant frequency of a tuned circuit including the steps of:
   coupling a pulse generator to introduce energy into the tuned circuit;
   generating a first pair of pulses from said pulse generator, the first pulse causing the tuned circuit to begin oscillation;
   adjusting the timing between the first pulse and the second pulse so that said second pulse causes the tuned circuit to cease oscillating; and
   measuring the timing between said pulses as a function of the resonant frequency of the tuned circuits;
   generating a second pair of pulses the timing between which is greater than the timing between the first pair of pulses;
   adjusting the timing of the second pair of pulses to cause the tuned circuit to cease oscillating; and
   substracting the timing between the first pair of pulses from the timing between the second pair of pulses to obtain an unambiguous value for the resonant frequency of the tuned circuit.

2. The method as defined in claim 1 including the step of coupling a coil to sense the oscillations within the tuned circuit, the output of said coil being connected to an oscilloscope to permit the visual monitoring of the oscillations.

3. The method as defined in claim 1 wherein the spacing between pulses required to cause the tuned circuit to cease oscillating at the occurrence of the second pulse is equal to $$n \frac{2\pi}{\sqrt{\frac{1}{LC} - \frac{1}{4R_p^2 C^2}}}$$

where $n$ is an integer, L is the inductance of the tuned circuit, C is the capacitance of the tuned circuit, and $R_p$ is the equivalent parallel resistance of the tuned circuit.

4. The method as defined in claim 3 wherein the tuned circuit as a high-Q circuit and wherein the spacing between pulses required to cause the tuned circuit to cease oscillating is approximately equal to $$n2\pi\sqrt{LC}$$

where $n$ is an integer, L is the inductance of the tuned circuit, and C is the capacitance of the tuned circuit.

References Cited
UNITED STATES PATENTS
2,627,546   2/1953   Paine _____ 324—68

OTHER REFERENCES
Gamertsfelder, G. R. and J. V. Holdam, Sinusoidal Waveform Generators (Chapter 4) in M.I.T. Radiation Laboratories Series, L. N. Ridenour Editor in Chief, N.Y., McGraw-Hill Book Company, Inc., 1949, vol. 19, p. 141.

Kerchner, R. M., and G. F. Corcoran, Alternating-Current Circuits, N.Y., John Wiley & Sons, Inc., p. 121.

EDWARD E. KUBASIEWICZ, Primary Examiner

U.S. Cl. X.R.
328—166

PO-1050
(5/69)

UNITED STATES PATENT OFFICE
CERTIFICATE OF CORRECTION

Patent No. 3,525,933        Dated August 25, 1970

Inventor(s) George H. Kramer

It is certified that error appears in the above-identified patent and that said Letters Patent are hereby corrected as shown below:

Column 3, line 33, "width as" should be -- width a as --.

Equation (8), found on column 4, lines 12-14 appears thus:

$$e(t) = \frac{k}{\beta}(\alpha^2+\beta^2)^{1/2} \cdot \epsilon^{-\alpha t} \cdot \sin(\beta t + \Psi)$$
$$- \delta(t-a)\frac{k}{\beta}(\alpha^2+\beta^2)^{1/2}\epsilon^{-\alpha t}\epsilon^{\alpha a} \sin[\beta(t-a)-\Psi] \quad (8)$$

but should read as follows:

$$e(t) = \frac{k}{\beta}(\alpha^2 + \beta^2)^{1/2} \epsilon^{-\alpha t} \cdot \sin(\beta t + \Psi)$$
$$- \delta(t-a)\frac{k}{\beta}(\alpha^2+\beta^2)^{1/2} \epsilon^{-\alpha t} \cdot \epsilon^{\alpha a} \cdot \sin\left[\beta(t-a)+\Psi\right] \quad (8)$$

SIGNED AND
SEALED
NOV 24 1970

(SEAL)
Attest:

Edward M. Fletcher, Jr.
Attesting Officer

WILLIAM E. SCHUYLER, JR.
Commissioner of Patents